US008098825B2

(12) United States Patent
Chou et al.

(10) Patent No.: US 8,098,825 B2
(45) Date of Patent: Jan. 17, 2012

(54) METHOD AND SYSTEM FOR ENHANCING DATA ENCRYPTION USING MULTIPLE-KEY LISTS

(75) Inventors: Chi-Yang Chou, Kao-hsiung (TW); Pei-Yen Chou, Hsin-chu (TW); Yeu-Chung Lin, Chang-hua (TW)

(73) Assignee: Condel International Technologies Inc., George Town (KY)

( * ) Notice: Subject to any disclaimer, the term of this patent is extended or adjusted under 35 U.S.C. 154(b) by 781 days.

(21) Appl. No.: 12/164,374

(22) Filed: Jun. 30, 2008

(65) Prior Publication Data

US 2009/0323966 A1    Dec. 31, 2009

(51) Int. Cl.
*G06F 21/00* (2006.01)
(52) U.S. Cl. ................. 380/277; 380/286; 713/193
(58) Field of Classification Search .............. 380/28–30, 380/44–47
See application file for complete search history.

(56) References Cited

U.S. PATENT DOCUMENTS

| 7,979,417 | B1 * | 7/2011 | Bharat et al. ............... 707/709 |
| 2002/0048369 | A1 * | 4/2002 | Ginter et al. ............... 380/277 |
| 2003/0174840 | A1 * | 9/2003 | Bogan ........................ 380/277 |
| 2007/0095928 | A1 * | 5/2007 | Balinsky et al. ........... 235/492 |

FOREIGN PATENT DOCUMENTS

| CN | 1236133 | 11/1999 |
| CN | 101236532 | 8/2008 |
| CN | 101251880 | 8/2008 |

OTHER PUBLICATIONS

Chinese language office action dated Apr. 12, 2011.
English language translation of abstract of CN 1236133 (published Nov. 24, 1999).
English language translation of abstract of CN 101236532 (published Aug. 6, 2008).
English language translation of abstract of CN 101251880 (published Aug. 27, 2008).

* cited by examiner

*Primary Examiner* — Gilberto Barron, Jr.
*Assistant Examiner* — Malcolm Cribbs
(74) *Attorney, Agent, or Firm* — Thomas|Kayden

(57) ABSTRACT

A method for enhancing data encryption using multiple-key lists is disclosed. A first multiple-key list and a second multiple-key list for a decryption key are created, wherein each multiple-key list comprises plural partial decryption keys. Content to be accessed is encrypted using an encryption key corresponding to the decryption key. The first multiple-key list is stored in a hidden area of a memory device storing the content. The second multiple-key list is stored in the memory device. When the memory device is installed on an electronic device, an application installed in the electronic device is activated to select a first partial decryption key from the first multiple-key list stored in the hidden area and a second partial decryption key from the memory device, re-organizes and codes the first and second partial decryption keys to recover the decryption key, and decrypts the content using the decryption key, enabling the electronic device to access the content.

16 Claims, 4 Drawing Sheets

Multiple-Key List A

KeyA1 : 123...
KeyA2 : cde...
KeyA3 : 567...
KeyA4 : ...
KeyA5 : ...
KeyA6 : ...
KeyA7 : ...
.
.
.
KeyAN : ...

Multiple-Key List B

KeyB1 : abc...
KeyB2 : efg...
KeyB3 : 456...
KeyB4 : ...
KeyB5 : ...
KeyB6 : ...
KeyB7 : ...
.
.
.
KeyBM : ...

$KeyA5 \oplus KeyB2 = KeyC$

METHOD AND SYSTEM FOR ENHANCING DATA ENCRYPTION USING MULTIPLE-KEY LISTS

BACKGROUND OF THE INVENTION

1. Field of the Invention

The invention relates to data encryption and decryption, and more particularly to a method and system for enhancing data encryption using multiple-key lists.

2. Description of the Related Art

Data delivery comprises on-line delivery and off-line delivery. The on-line delivery process transmits contents to consumers via a network. The off-line delivery process pre-loads contents in a specific storage medium, such as a compact disc, a digital versatile disc, or a flash memory device like a memory card or a universal serial bus (USB) disc.

FIG. 1 is a schematic view of a conventional method for data encryption and decryption for digital rights management.

When digital rights management of content is implemented on a storage medium, the content is first encrypted and it is determined whether or not a decryption key is hidden in the storage medium (step S101). If the decryption key is not hidden in the storage medium, the decryption key is required to be downloaded from a remote server via a network, such as internet (step S102). If the decryption key is hidden in the storage medium, an electronic device (such as a personal computer or a mobile phone) retrieves the decryption key to perform content decryption (step S103) and accesses the content when the decryption is complete (step S104).

Since the decryption key is hidden in the storage medium, it is an important object to protect the decryption key from being illegally detected and retrieved. Typically, content preloaded in DVD or SD card is protected by the method "Content Protection for Pre-recorded Media" (CPRM). The decryption key for such an encryption is represented by a 64-bit key block, comprising storage medium information (such as product type, manufacturer, and so on). The key block is stored in a hidden area of the storage medium, which cannot be accessed by ordinary consumers. The access of the key block must be implemented on an electronic device. Content must be encrypted using the key block that can be used in an authorized electronic device. Additionally, the manufacturer for the electronic device is required to join an industry association, such as the Secured Disk Association (SDA), to be authorized and be able to retrieve the key block from hidden area of SD card.

The described decryption key protection has some drawbacks. Content providers and manufacturers for electronic devices must join in an industry association with defined industry agreements whereby each member must comply with, such as the SDA. Thus, completely protecting the decryption key and provided content. However, such associations and agreements are not easily created and defined, like the competition between the Blu-ray disc association and the HD DVD association. While the protection is beneficial, illegal hacker attacks still occur. Additionally, at times, there are differences in commercial benefits between content providers and the manufacturers for electronic devices, whereby protection schemes cannot be thoroughly abided by. Consequently, there might exist certain loopholes in the entire protection scheme. Furthermore, the decryption key is stored in a single hidden area. While the hidden area is inaccessible for the average consumer, those skilled in the art can access the hidden area. When the hidden area is accessed, the decryption key can be retrieved to compromise the encryption protected content.

Thus, a method for enhancing data encryption using multiple-key lists is desirable.

BRIEF SUMMARY OF THE INVENTION

Methods for enhancing data encryption using multiple-key lists are provided. An exemplary embodiment of a method for enhancing data encryption using multiple-key lists comprises the following. A first multiple-key list and a second multiple-key list for a decryption key are created, wherein each multiple-key list comprises plural partial decryption keys. Content to be accessed is encrypted using an encryption key corresponding to the decryption key. The first multiple-key list is stored in a hidden area of a memory device storing the content. The second multiple-key list is stored in the memory device. When the memory device is installed on an electronic device, an application installed in the electronic device is activated to select a first partial decryption key from the first multiple-key list stored in the hidden area and a second partial decryption key from the memory device, re-organizes and codes the first and second partial decryption keys to recover the decryption key, and decrypts the content using the decryption key, enabling the electronic device to access the content.

Systems for enhancing data encryption using multiple-key lists are provided. An exemplary embodiment of a system for enhancing data encryption using multiple-key lists comprises a memory device and an electronic device. The memory device stores content to be accessed and a second multiple-key list for a decryption key corresponding to the content to be accessed and provides a hidden area storing a first multiple-key list for the decryption key. The electronic device is installed with an application. When the memory device is installed on the electronic device, the application is activated to select a first partial decryption key from the first multiple-key list stored in the hidden area and a second partial decryption key from the memory device, re-organizes and coded the first and second partial decryption keys to recover the decryption key, and decrypts the content using the decryption key, enabling the electronic device to access the content.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
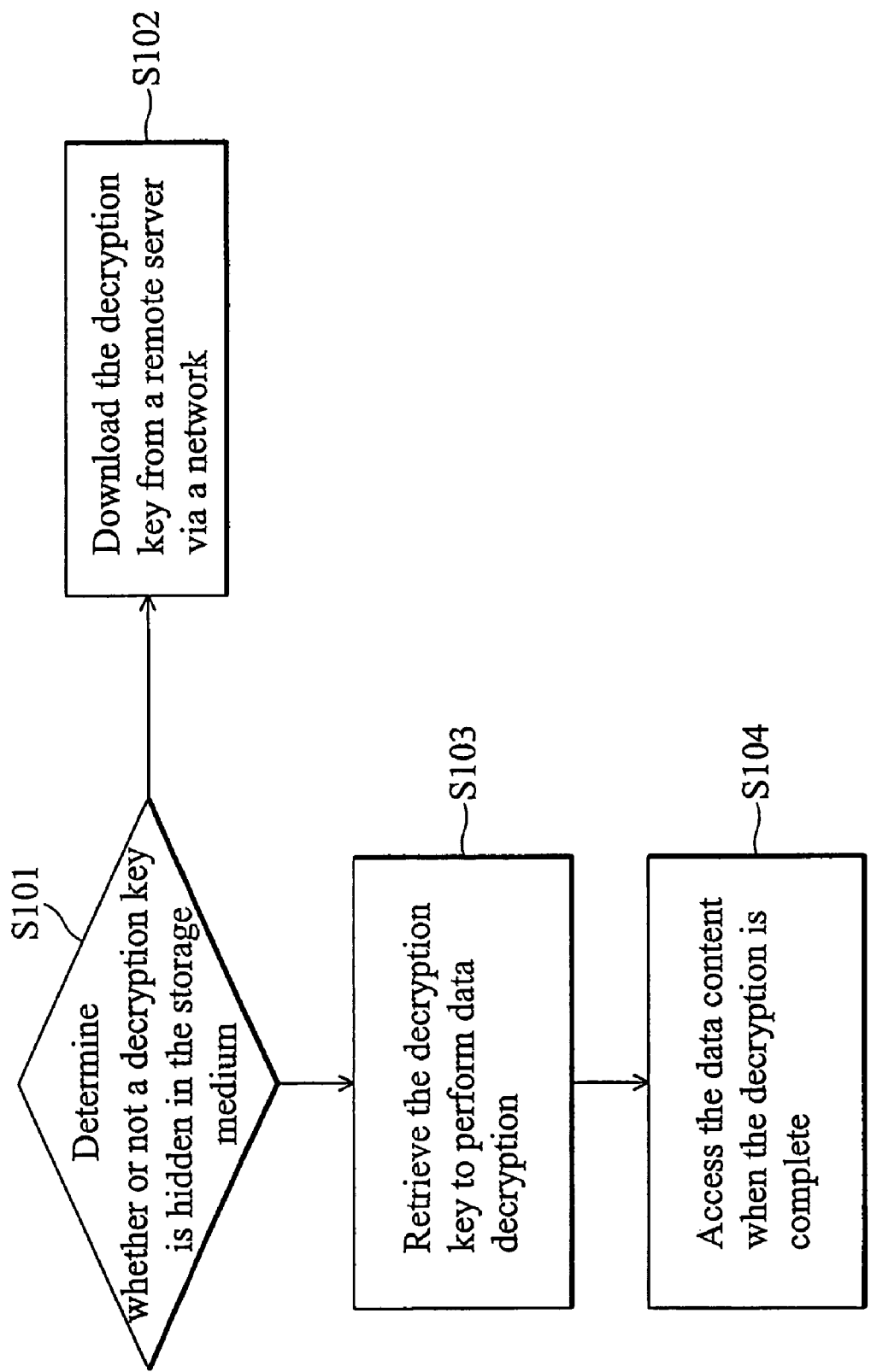
FIG. 1 is a schematic view of a conventional method for data encryption and decryption for digital rights management.

Several exemplary embodiments of the invention are described with reference to FIGS. 2 through 4, which generally relate to enhancing data encryption using multiple-key lists. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a method and system of enhancing data encryption using multiple-key lists.

An embodiment of the method divides a decryption key to multiple decryption keys stored in two key lists, respectively. When encrypted content is going to be accessed under authorization, the decryption keys are recombined using a specific way to decrypt the content.

Figure 2:
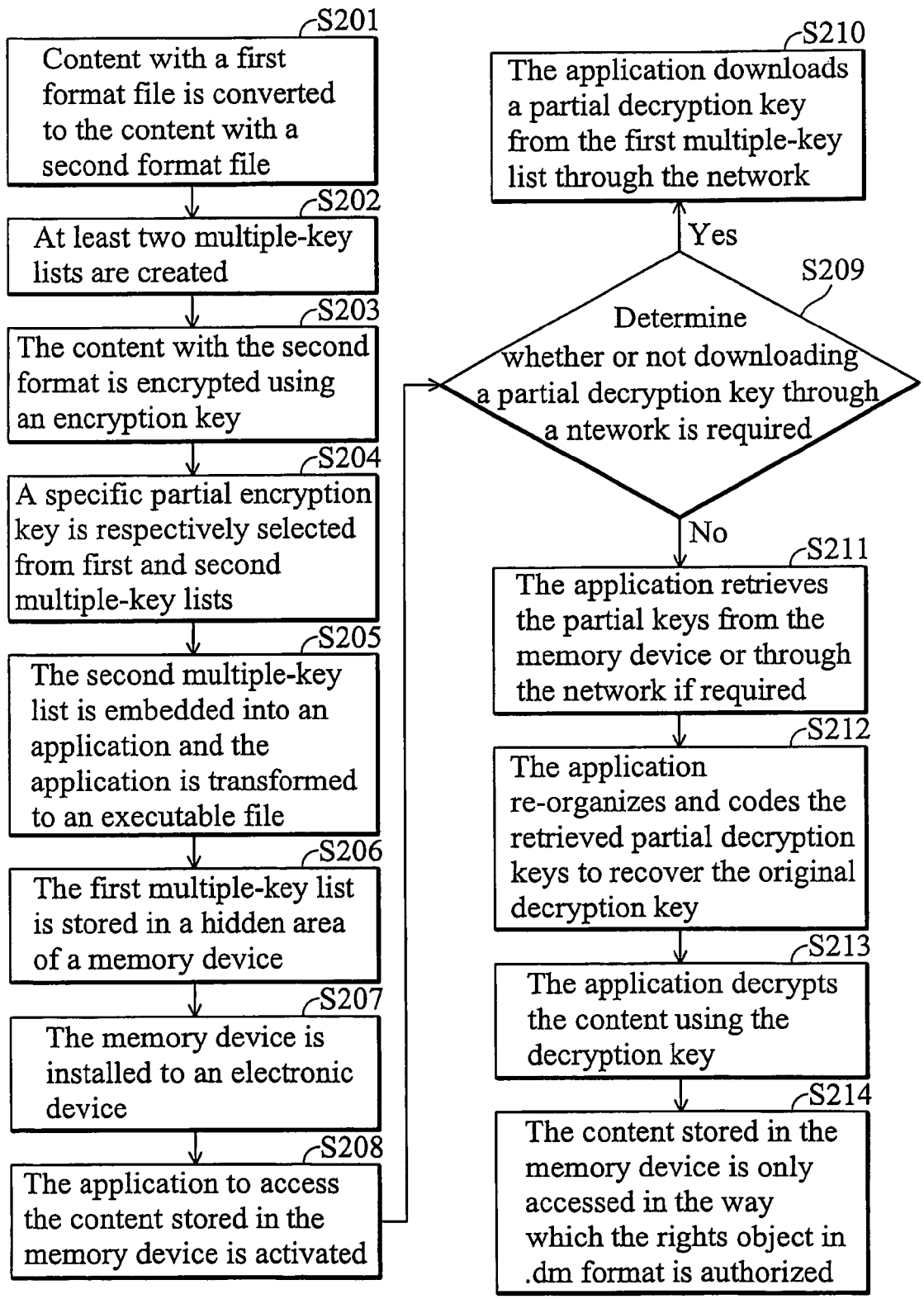
FIG. 2 is a flowchart of a method for enhancing data encryption using multiple-key lists of the present invention.

FIG. 2 is a flowchart of a method for enhancing data encryption using multiple-key lists of the present invention. FIG. 3 shows multiple-key lists of the present invention.

Content with a first format (.mp3, for example) is converted to the content with a second format (.dm for Open Mobile Alliance (OMA) DRM version 1.0, for example) applicable to a digital rights management (DRM) engine for an electronic device (step S201). At least two multiple-key lists for the content are created (step S202), wherein each list comprises multiple partial encryption keys. As shown in FIG. 3, a multiple-key list A and a multiple-key list B are shown. The multiple-key list A comprises N partial encryption keys (KeyA1, KeyA2, . . . , and KeyAN) while the multiple-key list B comprises M partial encryption keys (KeyB1, KeyB2, . . . , and KeyBM). The partial encryption keys of the multiple-key lists A and B are created by random number generator in order to reduce the risk of cryptanalysis attack. The partial encryption keys can be further processed using an encryption method, such as an Advanced Encryption System (AES), each represented by a 128/192/256-bit string.

The content with the second format is encrypted using an encryption key for the content (step S203). The encryption key is generated by the following process. A specific partial encryption key is respectively selected from the multiple-key lists A and B. The two partial encryption keys are combined using an AES algorithm to generate the encryption key, an AES encryption key. Additionally, the content with the second format .dm file is converted to the content with a third format file (.aes, for example). Since AES is a symmetric encryption scheme, the encryption key A is also the key for decryption.

A specific partial encryption key is respectively selected from the multiple-key lists A and B (for instance, the KeyA27 in the list A and the KeyA171 in the list B) by mathematical functions with a logic operation, such a Mod operation. The functions behave that f, g: x→y (mod z), where x represents a content product number, y represents an integer, and z represents the total number of keys provided by a multiple-key list (i.e. z=M or N herein respectively). (step S204). The function value is an integer from 0 to N−1 or 0 to M−1, respectively, representing the n-th or m-th partial encryption key selected from the multiple-key list A or B, respectively. Mapping a variable of an ideal key selection function to the range thereof is uniform that the selection probability of each partial encryption key in the multiple-key list is identical to each other. The probability is 1/N or 1/M in this embodiment.

The multiple-key list B is embedded into an application (representing a decryption program) and the application is transformed to an executable file (.sis for Symbian S60 V3, for example) for an electronic device using a compiler corresponding to an operating system (Symbian S60 V3, for example) of the electronic device (step S205). The executable file is represented by a low-level machine language which cannot be decompiled or is decompiled to generate meaningless binary codes, so that the application and the multiple-key list B cannot be recognized either.

The multiple-key list A is stored in a hidden area of a memory device (a memory card, for example) (step S206). The hidden area is created using a firmware associated with the microcontroller of the memory device. The reading and writing of data in the hidden area must be performed by specific software supported by the microcontroller and the software is packaged into the application to be transformed to the machine language, so that the hidden area and the multiple-key list A cannot be recognized. The hidden area is not defined by the industry protocol. Thus, even a person skilled in the art cannot easily access the hidden area to retrieve the multiple-key list A. The multiple-key list A can also be stored in a separate area, such as a remote server, from the memory device, thus further preventing the multiple-key list A from being detected and retrieved, so that if the application can be completely decompiled, the content with the .aes format cannot be decrypted.

It is noted that the multiple-key lists or the partial decryption keys provided by the multiple-key lists can be further encrypted by an encryption program for preferable protection.

When the memory device is installed to an electronic device (step S207), the application to access the content stored in the memory device is activated (step S208). It is determined whether or not downloading a specific partial decryption key (the KeyA5 as shown in FIG. 3, for example) through a network (such as the internet) is required (step S209), indicating that the multiple-key list A may be stored in the separate area, such as the remote server. If required, the application downloads the KeyA5 from the multiple-key list A stored through the network (step S210).

Figure 3:
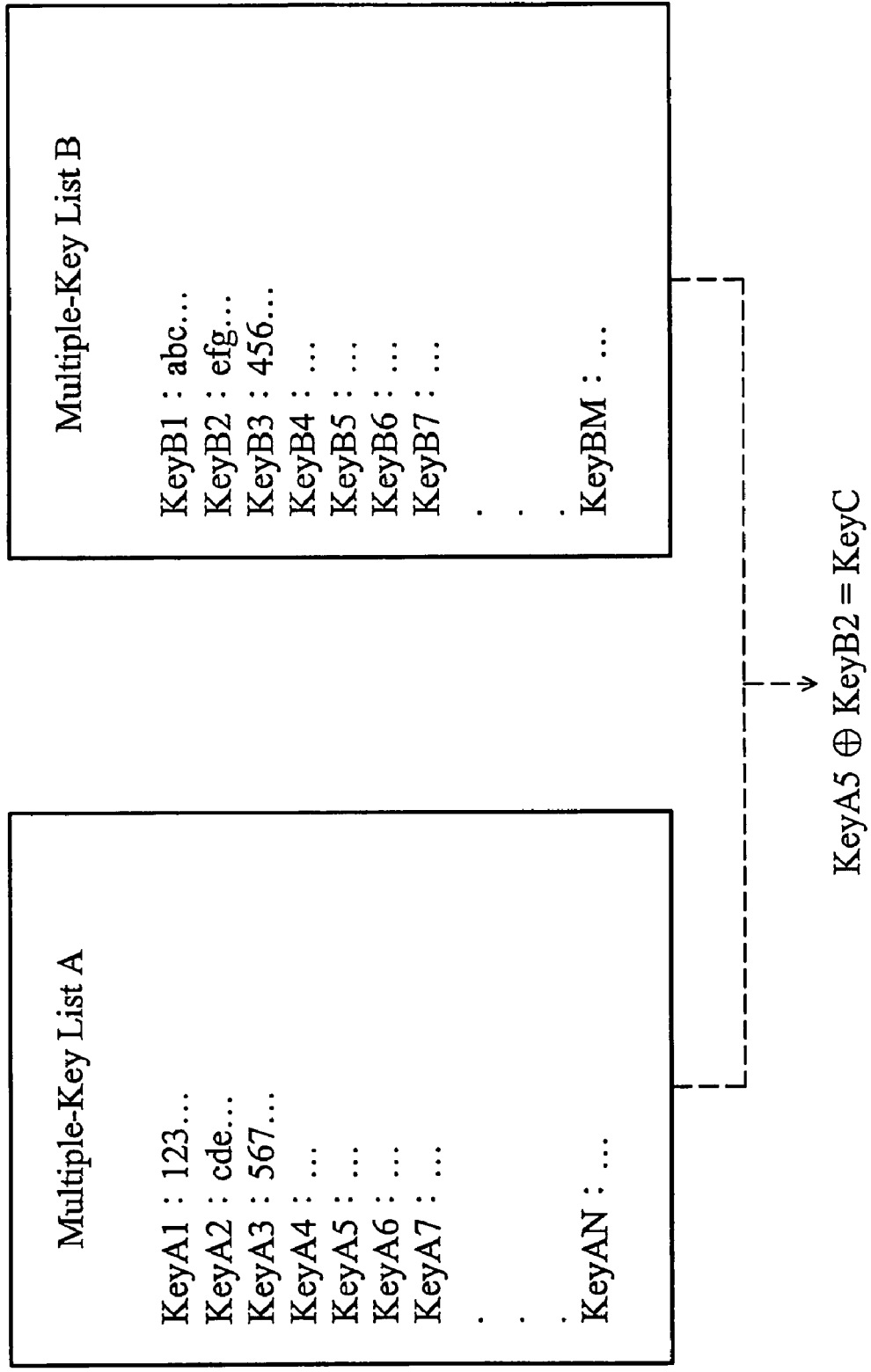
FIG. 3 shows multiple-key lists of the present invention.

If no partial decryption keys are required to be downloaded through the network, the application retrieves a specific partial decryption key from the multiple-key lists A and B, respectively (the KeyA5 and the KeyB2 as shown in FIG. 3, for example), or retrieves a specific partial decryption key (the KeyA5, for example) from the multiple-key list A and downloads a specific partial decryption key (the KeyB2, for example) through the network (step S211), and re-organizes and codes the retrieved partial decryption keys to recover the original decryption key (the KeyC as shown in FIG. 3, for example) using a logic operation (such as an XOR operation) (step S212).

It is noted that selection of a partial encryption key from the multiple-key list A is uncorrelated to that from that of the multiple-key list B, so that the generation of the decryption key by the combination of the selected partial encryption keys can be optimized to result in better protection for the decryption key.

The application decrypts the content using the decryption key (step S213), wherein the content with .dm format is recovered from .aes format. The digital rights management of the electronic device is activated by the application to convert the content with a .dm format to a .dcf format executable for OMA version 1.0, enabling the content stored in the memory device to only be accessed in the way which the rights object in .dm is authorized (step S214).

It is noted that the decryption key can be generated using more than two partial decryption keys selected from the more than two multiple-key lists. Additionally, the invention focuses on decomposing the decryption key into several multiple-key lists providing plural keys and selecting one of the keys from each generated multiple-key list to recovery the decryption key. Further, the multiple-key lists are placed in different positions of a memory device or in different storage media for preferable protection. Thus, storing the first multiple-key list in a memory device and the second multiple-key list in a hidden area of the memory device or even a server outside the memory device can clearly and completely describe the concept of the invention and is only exemplary but is not to be limitative.

Figure 4:
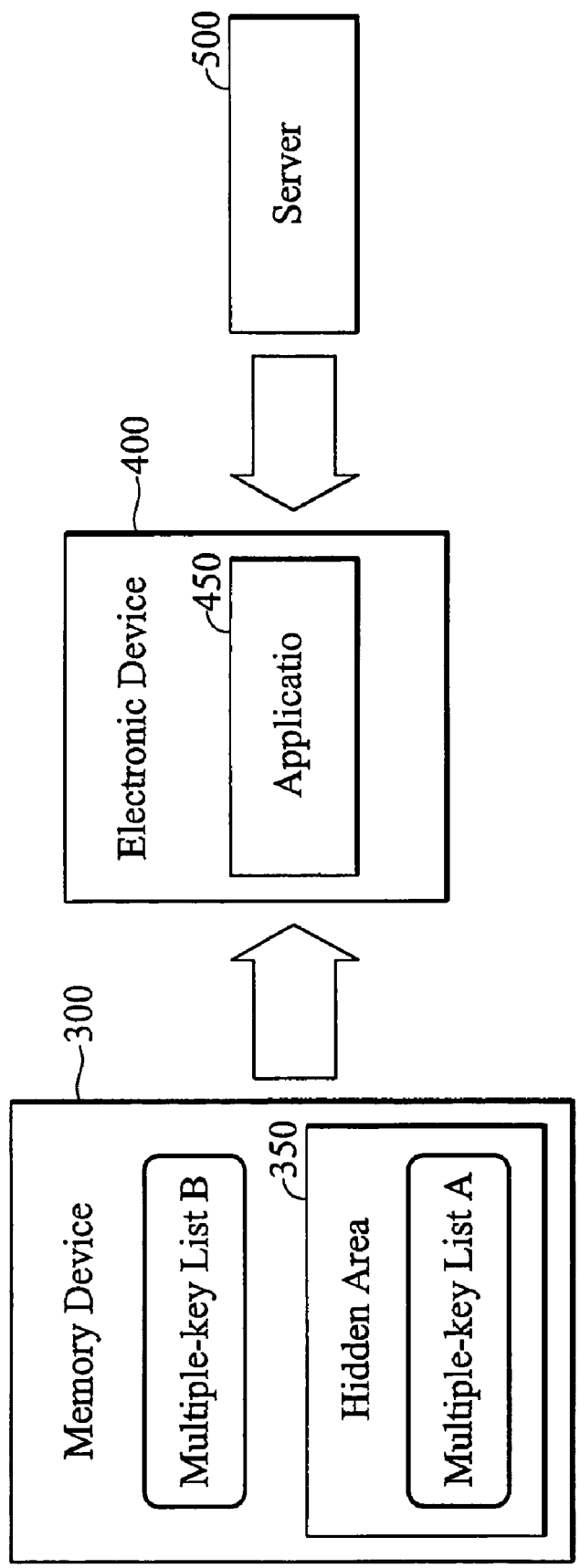
FIG. 4 is a schematic view of a system for enhancing data encryption using multiple-key lists of the present invention.

FIG. 4 is a schematic view of a system for enhancing data encryption using multiple-key lists of the present invention.

The system comprises a memory device 300, an electronic device 400, and a server 500 connected to the electronic device 400 via a network, such as the internet. The electronic device 400 provides an application 450. The memory device 300 stores a second multiple-key list (the multiple-key list B, for example) of an original decryption key (named an encryption key as well) for content to be accessed. The memory device 300 further provides a hidden area 350 to store a first multiple-key list (the multiple-key list A, for example) of the original decryption key.

The hidden area is created using a firmware associated with the microcontroller of the memory device 300. The reading and writing of data in the hidden area must be performed by specific software supported by the microcontroller and the software is packaged into the application to be transformed to the machine language, so that the hidden area and the second multiple-key list stored in the hidden area cannot be recognized.

Additionally, the second multiple-key list not stored in the hidden area is embedded into an application and the application is transformed to an executable file (.sis for Symbian S60 V3, for example) for the electronic device 400 using a compiler corresponding to an operating system (Symbian S60 V3, for example) of the electronic device 400. The executable file is represented by a low-level machine language which cannot be decompiled or is decompiled to generate meaningless binary codes, so that the application and the second multiple-key list not stored in the hidden area cannot be recognized.

It is noted that the second multiple-key list which is embedded in the application may also be stored in the server 500. It is further noted that the first multiple-key list stored in the hidden area may also be stored in the server 500 and the first multiple-key list can be downloaded from the server 500 through the network.

When the memory device 300 is installed on the electronic device 400, the application 450 to access the content stored in the memory device 300 is activated. The application 450 determines whether or not downloading a first partial decryption key through the network is required and, if required, downloads the first partial decryption key from the first multiple-key list stored in a server through the network. If no partial decryption keys are required to be downloaded through the network, the application 450 retrieves the first partial decryption key from the first multiple-key list and a second partial decryption key the second multiple-key list stored in the memory device 300 or downloads the first partial decryption key from the first multiple-key list stored in the server 500, if required, and retrieves the second partial decryption key the second multiple-key list stored in the memory device 300, and re-organizes and codes the first and second partial decryption keys to recover the original decryption key. The application 450 decrypts the content using the decryption key, enabling the electronic device 400 to access the content.

An embodiment of the method enhances data encryption and improves encryption key management using multiple-key lists that decreases time and cost for authentication and authorization of applications.

Methods and systems of the present disclosure, or certain aspects or portions of embodiments thereof, may take the form of a program code (i.e., instructions) embodied in media, such as SD card or USB disc, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for enhancing data encryption using multiple-key lists, comprising:

creating a first multiple-key list and a second multiple-key list for a decryption key, wherein each multiple-key list comprises plural partial decryption keys;

encrypting content to be accessed using an encryption key corresponding to the decryption key;

storing the first multiple-key list in a hidden area of a memory device storing the content;

storing the second multiple-key list in the memory device;

when the memory device is installed on an electronic device, activating an application installed in the electronic device;

the application selecting a first partial decryption key from the first multiple-key list stored in the hidden area and a second partial decryption key from the memory device according to a function with a variable correlating to the content and a non-negative integer function value;

the application re-organizing and coding the first and second partial decryption keys to recover the decryption key; and the application decrypting the content using the decryption key, enabling the electronic device to access the content, wherein the function is a modular operation of f, g: x→y (mod z), where x represents the variable correlating to the content, y represents an integer, and z represents the total number of keys provided by the first multiple-key list or the second multiple-key list.

2. The method of enhancing data encryption using multiple-key lists as claimed in claim 1, wherein the partial decryption keys of the first and second multiple-key lists are created by a random number generator.

3. The method of enhancing data encryption using multiple-key lists as claimed in claim 1, wherein the content is encrypted using an AES.

4. The method of enhancing data encryption using multiple-key lists as claimed in claim 1, further comprising:
   embedding the second multiple-key list into the application of the electronic device; and
   transforming the application to an executable file for the electronic device using a compiler corresponding to an operating system of the electronic device.

5. The method of enhancing data encryption using multiple-key lists as claimed in claim 1, wherein the first multiple-key list is further stored in a server, and connected to the electronic device through a network.

6. The method of enhancing data encryption using multiple-key lists as claimed in claim 5, further comprising:
   determining whether or not downloading of the first partial decryption key through the network is required; and
   if required, the application downloading the first partial decryption key from the first multiple-key list stored in the server and retrieving the second partial decryption keys from the second multiple-key list stored in the memory device.

7. A system of enhancing data encryption using multiple-key lists, comprising:
   a memory device, storing content to be accessed and a second multiple-key list for a decryption key corresponding to the content to be accessed and providing a hidden area storing a first multiple-key list for the decryption key; and
   an electronic device, installed with an application, wherein, when the memory device is installed on the electronic device, the application is activated to select a first partial decryption key from the first multiple-key list stored in the hidden area and a second partial decryption key from the memory device according to a function with a variable correlating to the content and a non-negative integer function value, re-organizes and codes the first and second partial decryption keys to recover the decryption key, and decrypts the content using the decryption key, enabling the electronic device to access the content,
   wherein the function is a modular operation of f, g: x→y (mod z), where x represents the variable correlating to the content, y represents an integer, and z represents the total number of keys provided by the first multiple-key list or the second multiple-key list.

8. The system of enhancing data encryption using multiple-key lists as claimed in claim 7, further comprising a server connected to the electronic device through a network, wherein the first multiple-key list is stored in the server.

9. The system of enhancing data encryption using multiple-key lists as claimed in claim 8, wherein the application determines whether or not downloading of the first partial decryption key through the network is required and, if required, downloads the first partial decryption key from the first multiple-key list stored in the server and retrieves the second partial decryption keys from the second multiple-key list stored in the memory device.

10. The system of enhancing data encryption using multiple-key lists as claimed in claim 7, wherein the partial decryption keys of the first and second multiple-key lists are created by a random number generator.

11. The system of hiding the decryption key in a dispersive way as claimed in claim 7, wherein the hidden area is created using a firmware of a microcontroller of the memory device.

12. A non-transitory computer-readable medium encoded with computer executable instructions for performing a method for enhancing data encryption using multiple-key lists, wherein the computer executable instructions comprises:
   creating a first multiple-key list and a second multiple-key list for a decryption key, wherein each multiple-key list comprises plural partial decryption keys;
   encrypting content to be accessed using an encryption key corresponding to the decryption key;
   storing the first multiple-key list in a hidden area of a memory device storing the content;
   storing the second multiple-key list in the memory device;
   when the memory device is installed on an electronic device, activating an application installed in the electronic device;
   the application selecting a first partial decryption key from the first multiple-key list stored in the hidden area and a second partial decryption key from the memory device according to a function with a variable correlating to the content and a non-negative integer function value;
   the application re-organizing and coding the first and second partial decryption keys to recover the decryption key; and
   the application decrypting the content using the decryption key, enabling the electronic device to access the content,
   wherein the first multiple-key list is further stored in a server, and is connected to the electronic device through a network, and
   wherein the function is a modular operation of f, g: x→y (mod z), where x represents the variable correlating to the content, y represents an integer, and z represents the total number of keys provided by the first multiple-key list or the second multiple-key list.

13. The non-transitory computer-readable medium as claimed in claim 12, wherein the partial decryption keys of the first and second multiple-key lists are created by a random number generator.

14. The non-transitory computer-readable medium as claimed in claim 12, wherein the content is encrypted using an AES.

15. The non-transitory computer-readable medium as claimed in claim 12, further comprising:
   embedding the second multiple-key list into the application of the electronic device; and
   transforming the application to an executable file for the electronic device using a compiler corresponding to an operating system of the electronic device.

16. The non-transitory computer-readable medium as claimed in claim 12, further comprising:
   determining whether or not downloading the first partial decryption key through the network is required; and
   if required, the application downloading the first partial decryption key from the first multiple-key list stored in the server and retrieving the second partial decryption keys from the second multiple-key list stored in the memory device.

* * * * *